United States Patent
Wang et al.

(10) Patent No.: US 11,582,682 B2
(45) Date of Patent: Feb. 14, 2023

(54) METHOD FOR DETERMINING CONTROL PLANE NODE, APPARATUS, AND WIRELESS COMMUNICATIONS SYSTEM

(71) Applicant: Huawei Technologies Co., Ltd., Shenzhen (CN)

(72) Inventors: Yuan Wang, Shanghai (CN); Fenqin Zhu, Shanghai (CN); Jingwang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/114,509

(22) Filed: Aug. 28, 2018

(65) Prior Publication Data

US 2018/0368056 A1 Dec. 20, 2018

Related U.S. Application Data

(63) Continuation of application No. PCT/CN2016/074836, filed on Feb. 29, 2016.

(51) Int. Cl.
*H04W 48/14* (2009.01)
*H04W 48/18* (2009.01)
(Continued)

(52) U.S. Cl.
CPC ........... *H04W 48/14* (2013.01); *H04W 48/12* (2013.01); *H04W 48/18* (2013.01); *H04W 76/12* (2018.02); *H04W 48/08* (2013.01)

(58) Field of Classification Search
CPC combination set(s) only.
See application file for complete search history.

(56) References Cited

U.S. PATENT DOCUMENTS

2013/0007232 A1 1/2013 Wang et al.
2013/0344866 A1 12/2013 Guo
(Continued)

FOREIGN PATENT DOCUMENTS

CN 101610504 A 12/2009
CN 103269282 A 8/2013
(Continued)

OTHER PUBLICATIONS

3rd Generation Partnership Project; Technical Specification Group Services and System Aspects; Enhancements of Dedicated Core Networks selection mechanism, (Release 14), (Jan. 2016) (Year: 2016).*

(Continued)

*Primary Examiner* — Romani Ohri
(74) *Attorney, Agent, or Firm* — Leydig, Voit & Mayer, Ltd.

(57) ABSTRACT

Embodiments of the present invention relate to the communications field, and provide a method for determining a control plane node, an apparatus, and a wireless communications system, so as to select, for UE, a control plane node corresponding to a network slice to which the UE belongs, thereby ensuring that the control plane node can provide a customized service for the UE. The method includes: obtaining, by UE, indication information, where the indication information is used to indicate a network slice to which the UE belongs; and sending, by the UE, an access layer request message to a radio access network node, where the access layer request message includes the indication information, and the access layer request message is used to trigger the radio access network node to determine, based on the indication information, a control plane node corresponding to the network slice for the UE.

11 Claims, 4 Drawing Sheets

(51) Int. Cl.
*H04W 76/12* (2018.01)
*H04W 48/12* (2009.01)
*H04W 48/08* (2009.01)

(56) References Cited

U.S. PATENT DOCUMENTS

| | | | |
|---|---|---|---|
| 2014/0211728 | A1 | 7/2014 | Zembutsu et al. |
| 2014/0301366 | A1 | 10/2014 | Guo |
| 2016/0006623 | A1 | 1/2016 | LIU et al. |
| 2017/0070892 | A1 | 3/2017 | Song et al. |
| 2018/0249530 | A1 | 8/2018 | Salkintzis |
| 2018/0310238 | A1* | 10/2018 | Opsenica ............. H04W 12/06 |
| 2018/0324761 | A1 | 11/2018 | Velev et al. |
| 2018/0352501 | A1* | 12/2018 | Zhang ................. H04W 48/14 |
| 2018/0368140 | A1* | 12/2018 | Centonza .......... H04W 72/0426 |
| 2019/0014515 | A1* | 1/2019 | Zee ...................... H04W 76/27 |
| 2019/0021047 | A1* | 1/2019 | Zong ................... H04W 76/11 |
| 2019/0045351 | A1* | 2/2019 | Zee ...................... H04W 48/18 |
| 2019/0141760 | A1 | 5/2019 | Stille et al. |

FOREIGN PATENT DOCUMENTS

| | | |
|---|---|---|
| CN | 106375987 A | 2/2017 |
| CN | 106572517 A | 4/2017 |
| CN | 106993329 A | 7/2017 |
| EP | 2763496 A1 | 8/2014 |
| JP | 2018534867 A | 11/2018 |
| JP | 2018537014 A | 12/2018 |
| WO | 2013047822 A1 | 4/2013 |
| WO | 2015003973 A1 | 1/2015 |
| WO | 2015182141 A1 | 12/2015 |
| WO | 2017061111 A1 | 4/2017 |

OTHER PUBLICATIONS

"3rd Generation Partnership Project;Technical Specification Group Services and System Aspects; General Packet Radio Service (GPRS) enhancements for Evolved Universal Terrestrial Radio Access Network (E-UTRAN) access (Release 13)," 3GPP TS 23.401 V13.5.0, pp. 1-337, 3rd Generation Partnership Project—Valbonne, France (Dec. 2015).

"3rd Generation Partnership Project; Technical Specification Group Services and System Aspects; Study on Architecture for Next Generation System (Release 14)," 3GPP TR 23.799 V0.2.0, pp. 1-17, 3rd Generation Partnership Project—Valbonne, France (Feb. 2016).

Shimojo, "Future Core Network for the 5G Era," NTT DOCOMO Technical Journal, The Telecommunications Association, vol. 23, No. 4, pp. 49-58, NTT DOCOMO Inc., Tokyo, Japan (Apr. 2016).

"NGMN 5G White Paper," NGMN Alliance, Version 1.0, pp. 1-125, Next Generation Mobile Network Alliance, Frankfurt, Germany (Feb. 17, 2015).

"Update of solution 1," SA WG2 Meeting #113, Saint Kitts, KN, S2-160263, pp. 1-6, 3rd Generation Partnership Project, Valbonne, France (Jan. 25-29, 2016).

Shimojo, "Future Core Network for the 5G Era," NTT Docomo Technical Journal, The Telecommunications Association, vol. 23, No. 4, NTT Docomo Inc., Tokyo, Japan (Apr. 2016), vol. 17 pp. 50-59.

* cited by examiner

METHOD FOR DETERMINING CONTROL PLANE NODE, APPARATUS, AND WIRELESS COMMUNICATIONS SYSTEM

CROSS-REFERENCE TO RELATED APPLICATIONS

This application is a continuation of International Application No. PCT/CN2016/074836, filed on Feb. 29, 2016, the disclosure of which is hereby incorporated by reference in its entirety.

TECHNICAL FIELD

Embodiments of the present invention relate to the communications field, and in particular, to a method for determining a control plane node, an apparatus, and a wireless communications system.

BACKGROUND

A plurality of network slices are deployed in a wireless communications system, so that the wireless communications system can be adapted to different application scenarios. For example, as shown in FIG. 1, different network slices may be deployed for different types of user equipment (UE) in the wireless communications system. For example, MBB network slices may be deployed for a mobile broadband (MBB) UE, V2V network slices may be deployed for a vehicle to vehicle communication (V2V) UE, and MTC network slices may be deployed for a machine type communication UE.

After receiving a service request message sent by UE, a radio access network node may usually parse a globally unique mobility management entity identifier (GUMMEI) field in a globally unique temporary identity (GUTI) carried in the service request message, to obtain an identifier of a mobility management entity (MME) previously connected to the UE. If the identifier of the MME is not included in an MME list stored in the radio access network node, the radio access network node may select a proper MME for the UE based on an MME selection function, obtain an access address of the MME through DNS query, and then send the service request message of the UE to the MME for processing.

However, a plurality of network slices are deployed in the wireless communications system, and MMES that are corresponding to network slices and that provide customized services for different types of UE are different. Therefore, when the radio access network node selects an MME for UE by using an MME selection function, an MME other than an MME that is corresponding to a network slice to which the UE belongs may be selected. Consequently, the MME selected by the radio access network node for the UE cannot provide a customized service for the UE.

SUMMARY

Embodiments of the present invention provide a method for determining a control plane node, an apparatus, and a wireless communications system, so as to select, for UE, a control plane node corresponding to a network slice to which the UE belongs, thereby ensuring that the control plane node can provide a customized service for the UE.

The following technical solutions are used in the embodiments of the present invention to achieve the foregoing objective.

According to a first aspect, an embodiment of the present invention provides a method for determining a control plane node, including:

obtaining, by user equipment UE, indication information, where the indication information is used to indicate a network slice to which the UE belongs; and sending, by the UE, an access layer request message to a radio access network node, where the access layer request message includes the indication information, and the access layer request message is used to trigger the radio access network node to determine, based on the indication information, a control plane node corresponding to the network slice for the UE.

In this embodiment of the present invention, the indication information that is sent by the UE to the radio access network node and that is used for determining a control plane node for the UE can accurately indicate the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Optionally, in this embodiment of the present invention, a specific manner of the obtaining, by UE, indication information may include:

obtaining, by the UE, the indication information that is preconfigured;

receiving, by the UE, the indication information sent by the control plane node; or receiving, by the UE, a temporary identity sent by the control plane node; and obtaining the indication information based on the temporary identity, where the temporary identity includes the indication information.

In this embodiment of the present invention, the UE may obtain the indication information in any one of the foregoing three manners. Obtaining the preconfigured indication information by the UE may reduce implementation complexity; receiving, by the UE, the indication information sent by the control plane node may ensure that an existing message format remains unchanged; and obtaining the indication information by the UE based on a GUTI requires an improvement based on an existing message format, and an implementation thereof is relatively convenient.

Optionally, the indication information is an identifier of a network slice, and a specific manner of the obtaining, by UE, indication information may include:

obtaining, by the UE, identifier information of the network slice; and obtaining, by the UE based on the identifier information of the network slice and a preconfigured mapping relationship, the identifier that is of the network slice and that is corresponding to the identifier information of the network slice, where the mapping relationship includes a mapping relationship between the identifier information of the network slice and the identifier of the network slice.

In this embodiment of the present invention, the UE may directly obtain the identifier of the network slice to which the UE belongs. Alternatively, the UE may first obtain the identifier information of the network slice to which the UE belongs, and then obtain the identifier of the network slice based on the identifier information of the network slice. A method for directly obtaining, by the UE, the identifier of the network slice to which the UE belongs may be applied to a scenario in which the identifier of the network slice has been standardized. A method for indirectly obtaining, by the UE, the identifier of the network slice to which the UE belongs may be applied to a scenario in which the identifier of the network slice is not standardized. That is, the method for determining a control plane node provided in this embodiment of the present invention are compatible with both the scenario in which the identifier of the network slice has been standardized and the scenario in which the identifier of the network slice is not standardized.

According to a second aspect, an embodiment of the present invention provides a method for determining a control plane node, including:

receiving, by a radio access network node, an access layer request message sent by user equipment UE, where the access layer request message includes indication information, and the indication information is used to indicate a network slice to which the UE belongs; and determining, by the radio access network node for the UE based on the indication information, a control plane node corresponding to the network slice to which the UE belongs.

In this embodiment of the present invention, the indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

Optionally, the determining, by the radio access network node for the UE based on the indication information, a control plane node corresponding to the network slice to which the UE belongs includes:

obtaining, by the radio access network node based on the indication information, an identifier of the network slice to which the UE belongs;

obtaining, by the radio access network node based on the identifier of the network slice to which the UE belongs and a preconfigured first mapping relationship, an identifier that is of the control plane node and that is corresponding to the identifier of the network slice to which the UE belongs, where the first mapping relationship includes a mapping relationship between the identifier of the network slice to which the UE belongs and the identifier of the control plane node corresponding to the network slice to which the UE belongs; and determining, by the radio access network node for the UE based on the identifier of the control plane node, the control plane node corresponding to the network slice to which the UE belongs.

In this embodiment of the present invention, the radio access network node may determine the control plane node for the UE based on the identifier of the network slice to which the UE belongs. Therefore, it can be ensured that the control plane node is the control plane node corresponding to the network slice to which the UE belongs, so as to ensure that the control plane node can provide a customized service for the UE.

Optionally, the indication information is the identifier information of the network slice.

A specific manner of the obtaining, by the radio access network node based on the indication information, an identifier of the network slice to which the UE belongs may include:

obtaining, by the radio access network node based on the identifier information of the network slice and a preconfigured second mapping relationship, the identifier that is of the network slice and that is corresponding to the identifier information of the network slice, where the second mapping relationship includes a mapping relationship between the identifier information of the network slice and the identifier of the network slice.

In this manner, the radio access network node first obtains the identifier information of the network slice to which the UE belongs, and then obtains the identifier of the network slice based on the identifier information of the network slice. This manner may be applied to a scenario in which the identifier of the network slice is not standardized.

According to a third aspect, an embodiment of the present invention provides a method for determining a control plane node, including:

receiving, by the control plane node, a non-access stratum request message sent by user equipment UE; obtaining, by the control plane node, a use type of the UE based on the non-access stratum request message; obtaining, by the control plane node based on the use type of the UE and a preconfigured mapping relationship, indication information corresponding to the use type of the UE, where the indication information is used to indicate a network slice to which the UE belongs, and the mapping relationship includes a mapping relationship between the use type of the UE and the indication information; and sending, by the control plane node, the indication information to the UE.

In this embodiment of the present invention, the control plane node may send, to the UE, the indication information that accurately indicates the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Optionally, a specific manner of the sending, by the control plane node, the indication information to the UE may include:

sending, by the control plane node, a temporary identity to the UE, where the temporary identity includes the indication information.

A manner in which the control plane node sends the indication information to the UE by using a temporary identity (or specifically a GUTIUE) may be improved on the basis of an existing message format, and an implementation thereof is relatively convenient.

According to a fourth aspect, an embodiment of the present invention provides UE, including:

an obtaining unit, configured to obtain indication information, where the indication information is used to indicate a network slice to which the UE belongs; and a sending unit, configured to send an access layer request message to a radio access network node, where the access layer request message includes the indication information obtained by the obtaining unit, the access layer request message is used to trigger the radio access network node to determine, based on the indication information, a control plane node corresponding to the network slice for the UE.

In this embodiment of the present invention, the indication information that is sent by the UE to the radio access network node and that is used for determining a control plane node for the UE can accurately indicate the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Optionally, the obtaining unit is specifically configured to obtain the indication information that is preconfigured;

the obtaining unit is specifically configured to receive the indication information sent by the control plane node; or the obtaining unit is specifically configured to receive a temporary identity sent by the control plane node, and obtain the indication information based on the temporary identity, where the temporary identity includes the indication information.

Optionally, the indication information is an identifier of the network slice.

The obtaining unit is specifically configured to: obtain the identifier information of the network slice; and obtain, based on the identifier information of the network slice and a preconfigured mapping relationship, the identifier that is of the network slice and that is corresponding to the identifier information of the network slice, where the mapping relationship includes a mapping relationship between the identifier information of the network slice and the identifier of the network slice.

For detailed description of technical effects in optional manners of the fourth aspect, refer to the related description of technical effects in corresponding optional manners of the first aspect. Details are not described herein again.

According to a fifth aspect, an embodiment of the present invention provides a radio access network node, including:

a receiving unit, configured to receive an access layer request message sent by user equipment UE, where the access layer request message includes indication information, and the indication information is used to indicate a network slice to which the UE belongs; and a determining unit, configured to determine, based on the indication information received by the receiving unit, a control plane node corresponding to the network slice for the UE.

In this embodiment of the present invention, the indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

Optionally, the determining unit is specifically configured to: obtain, based on the indication information, the identifier of the network slice to which the UE belongs; obtain, based on the identifier of the network slice and a preconfigured first mapping relationship, an identifier that is of the control plane node and that is corresponding to the identifier of the network slice; and determine, based on the identifier of the control plane node, the control plane node corresponding to the network slice for the UE, where the first mapping relationship includes a mapping relationship between the identifier of the network slice to which the UE belongs and the identifier of the control plane node.

Optionally, the indication information is the identifier information of the network slice.

The determining unit is specifically configured to obtain, based on the identifier information of the network slice and a preconfigured second mapping relationship, the identifier that is of the network slice and that is corresponding to the identifier information of the network slice, where the second mapping relationship includes a mapping relationship between the identifier information of the network slice to which the UE belongs and the identifier of the network slice.

For detailed description of technical effects in optional manners of the fifth aspect, refer to the related description of technical effects in corresponding optional manners of the second aspect. Details are not described herein again.

According to a sixth aspect, an embodiment of the present invention provides a control plane node, including:

a receiving unit, configured to receive a non-access stratum request message sent by user equipment UE;

an obtaining unit, configured to obtain a use type of the UE based on the non-access stratum request message received by the receiving unit, and obtain, based on the use type of the UE and a preconfigured mapping relationship, indication information corresponding to the use type of the UE, where the mapping relationship includes a mapping relationship between the use type of the UE and the indication information, and the indication information is used to indicate a network slice to which the UE belongs; and a sending unit, configured to send the indication information obtained by the obtaining unit to the UE.

In this embodiment of the present invention, the control plane node may send, to the UE, the indication information that accurately indicates the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Optionally, the sending unit is specifically configured to send a temporary identity to the UE, where the temporary identity includes the indication information.

For detailed description of technical effects in optional manners of the sixth aspect, refer to the related description of technical effects in corresponding optional manners of the third aspect. Details are not described herein again.

Optionally, in the first aspect to the sixth aspect, the indication information is the identifier of the network slice or the identifier information of the network slice, and the identifier information of the network slice is used to indicate the identifier of the network slice.

That the indication information is the identifier of the network slice may be applicable to a scenario in which the identifier of the network slice has been standardized; and that the indication information is the identifier information of the network slice may be applicable to a scenario in which the identifier of the network slice is not standardized. That is, the method for determining a control plane node provided in this embodiment of the present invention are compatible with both the scenario in which the identifier of the network slice has been standardized and the scenario in which the identifier of the network slice is not standardized.

Optionally, in the first aspect, the third aspect, the fourth aspect, and the sixth aspect, the temporary identity may be a globally unique temporary identity GUTI; and the GUTI includes the indication information, or the GUTI includes a globally unique mobility management entity identifier GUMMEI, and the GUMMEI includes the indication information.

Optionally, in the first aspect, the third aspect, the fourth aspect, and the sixth aspect, the GUTI includes an MME-temporary mobile subscriber identity M-TMSI field, and the M-TMSI field is used to indicate the indication information;

the GUMMEI includes a public land mobile network PLMN identifier field, and the PLMN identifier field is used to indicate the indication information;

the GUMMEI includes a mobility management entity MME group identifier field, and the MME group identifier field is used to indicate the indication information; or the GUTI or the GUMMEI includes a network slice identifier field, and the network slice identifier field is used to indicate the indication information.

Optionally, in the second aspect and the fifth aspect, the indication information may be carried in a temporary identity in the access layer request message.

Optionally, in the second aspect and the fifth aspect, the access layer request message includes a GUMMEI, and the GUMMEI includes the indication information.

Optionally, in the second aspect and the fifth aspect, the GUMMEI includes a PLMN identifier field, and the PLMN identifier field is used to indicate the indication information;

the GUMMEI includes an MME group identifier field, and the MME group identifier field is used to indicate the indication information; or the access layer request message or the GUMMEI includes a network slice identifier field, and the network slice identifier field is used to indicate the indication information.

This embodiment of the present invention may support a plurality of manners of indicating indication information, so that indication of indication information may be flexibly implemented.

According to a seventh aspect, an embodiment of the present invention provides user equipment UE, including a processor, a transceiver, a memory, and a system bus. The memory is configured to store a computer executable instruction. The processor, the transceiver, and the memory are connected to and communicate with each other by using the system bus. When the UE runs, the processor executes the computer executable instruction stored in the memory, so that the UE performs the method for determining a control plane node according to any one of the first aspect or optional manners of the first aspect.

According to an eighth aspect, an embodiment of the present invention provides a radio access network node, including a processor, a transceiver, a memory, and a system bus. The memory is configured to store a computer executable instruction. The processor, the transceiver, and the memory are connected to and communicate with each other by using the system bus. When the radio access network node runs, the processor executes the computer executable instruction stored in the memory, so that the radio access network node performs the method for determining a control plane node according to any one of the second aspect or optional manners of the second aspect.

According to a ninth aspect, an embodiment of the present invention provides a control plane node, including a processor, a transceiver, a memory, and a system bus. The memory is configured to store a computer executable instruction. The processor, the transceiver, and the memory are connected to and communicate with each other by using the system bus. When the control plane node runs, the processor executes the computer executable instruction stored in the memory, so that the control plane node performs the method for determining a control plane node according to any one of the third aspect or optional manners of the third aspect.

According to a tenth aspect, an embodiment of the present invention provides a wireless communications system, including:

the user equipment UE according to any one of the fourth aspect, optional manners of the fourth aspect, or the seventh aspect, the radio access network node according to any one of the fifth aspect, optional manners of the fifth aspect, or the eighth aspect, and the control plane node according to any one of the sixth aspect, optional manners of the sixth aspect, or the ninth aspect.

In this embodiment of the present invention, the indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention.

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, AB may be understood as A or B.

In the embodiments of the present invention, the word such as "example" or "for example" is used to represent giving an example, an illustration, or a description. Any embodiment or design solution described as an "example" or "for example" in the embodiments of the present invention should not be explained as being more preferred or having more advantageous than another embodiment or design solution. Exactly, use of the word such as "example" or "for example" is intended to present a related concept in a specific manner.

In the descriptions of the present invention, unless otherwise specified, "a plurality of" means two or more than two. For example, a plurality of network slices refer to two or more network slices.

In addition, the terms "include", "contain", or any other variant thereof mentioned in descriptions of the present invention, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In the following description, specific details such as a particular system structure, an interface, and a technology are set forth in an illustrative but not a restrictive sense to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

Figure 1:
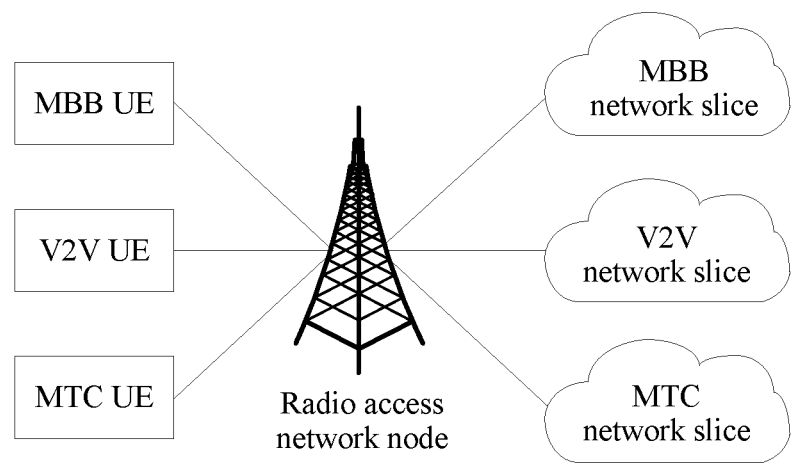
FIG. 1 is a schematic diagram of a network slice deployed in a wireless communications system in the prior art.
Figure 2:
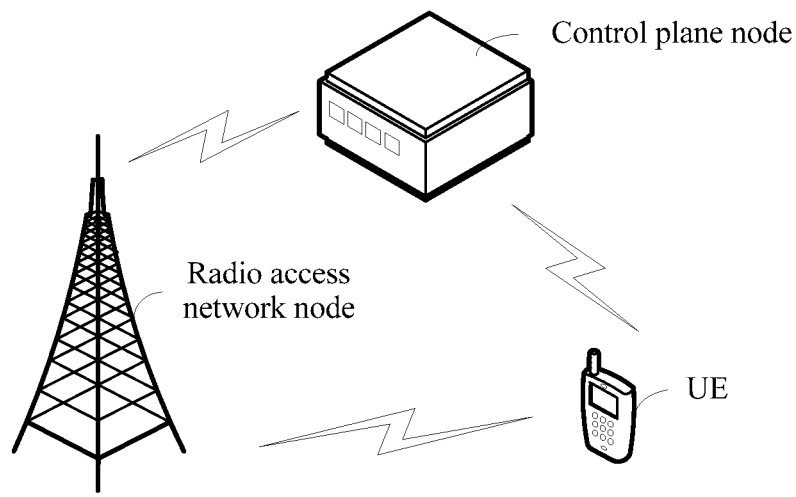
FIG. 2 is a schematic structural diagram of a wireless communications system according to an embodiment of the present invention.

A method for determining a control plane node that is provided in an embodiment of the present invention may be applied to a wireless communications system. For example, the wireless communications system may be a system using the 4th generation mobile communication technology (4G), hereinafter referred to as a 4G system, or may be a system using the 5th generation mobile communication technology (5G), hereinafter referred to as a 5G system, or another wireless communications system in which a plurality of network slices are deployed. For example, as shown in FIG. 2, FIG. 2 is a schematic architectural diagram of a wireless communications system according to an embodiment of the present invention. In FIG. 2, the wireless communications system includes a control plane node, a radio access network node, and UE. Any two of the control plane node, the radio access network node, and the UE can interact with each other. In this embodiment of the present invention, as shown in FIG. 2, a plurality of network slices are deployed in the wireless communications system, and each network slice is corresponding to one control plane node configured to provide a customized service for UE connected to the network slice.

As shown in FIG. 2, specifically, different network slices may be provided for different types of UE in a same infrastructure by combining a software defined networking (SDN) technology and a network functions virtualization (NFV) technology; that is, network slices that provide different customized services for the different types of UE may be deployed in the wireless communications system. For example, an MBB network slice may be deployed on MBB UE, a V2V network slice may be deployed on V2V UE, an MTC network slice is deployed on MTC UE, and an ITS network slice may be deployed on remote machine and intelligent transfer system (ITS) UE.

In this embodiment of the present invention, functions of different network slices may be implemented based on different customized software, and optimization configuration may be performed based on a type and a feature of the UE, so that the UE can obtain a customized service provided by a control plane node corresponding to the network slice only when different type of UE is connect to a network slice to which the UE belongs. The network slice implemented based on customized software allows an operator to provide a network used as a service for UE; that is, the operator can virtualize an entity network and provide a connection service for different types of UE and different application scenarios in a "network as a service" form, and flexibly combine network performance indicators such as rate, capacity, coverage, delay, reliability, security and availability, so as to meet specific requirements of each UE and each application scenario.

Based on the wireless communications system shown in FIG. 2 and the foregoing description, because a plurality of network slices are deployed in the wireless communications system and each network slice is corresponding to one control plane node, different control plane nodes provide a customized service to different types of UE. Therefore, when a radio access network node selects a control plane node for UE, a control plane node other than a control plane node corresponding to a network slice to which the UE belongs may be selected. Consequently, the control plane node selected by the radio access network node for the UE cannot provide a customized service for the UE.

To resolve the foregoing problem, the embodiments of the present invention provide a method for determining a control plane node. The UE obtains the indication information used to indicate the network slice to which the UE belongs, and sends the indication information to the radio access network node by using the access layer request message, so that the radio access network node determines, for the UE based on the indication information, the control plane node corresponding to the network slice to which the UE belongs. The radio access network node can select a control plane node corresponding to the network slice to which the UE belongs, so as to ensure that the control plane node may provide a customized service for the UE.

In this embodiment of the present invention, the control plane node may be a network element or a functional entity that is in a wireless communications system and that provides a control plane function for the UE. For example, in a 4G system, the control plane node may be an MME; and in a 5G system, the control plane node may be a function module that provides a control plane function for the UE.

The radio access network node may be a base station, a distributed base station, a cloud radio access network (cloud RAN, CRAN) device, or an access network device that includes a radio access network controller and a base station. The distributed base station or the CRAN device may include both a base band unit (BBU) and a remote radio unit (RRU). Alternatively, the CRAN device may be a CRAN device with flexible protocol layers. The CRAN device with flexible protocol layers specifically includes both an enhanced BBU and an enhanced RRU. Both the enhanced BBU and the enhanced RRU may include some or all radio protocol layers. The wireless protocol layers include a Packet Data Convergence Protocol (PDCP) layer, a Radio Link Control (RLC) layer, a Media Access Control (MAC) layer, and a physical layer (PHY). The RRU further includes a radio frequency (RF) part.

The UE may be a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, user equipment, or the like.

The following describes in detail the technical solutions in the embodiments of the present invention with reference to the accompanying drawings in the embodiments of the present invention. Apparently, the described embodiments are merely some rather than all embodiments of the present invention.

Figure 3:
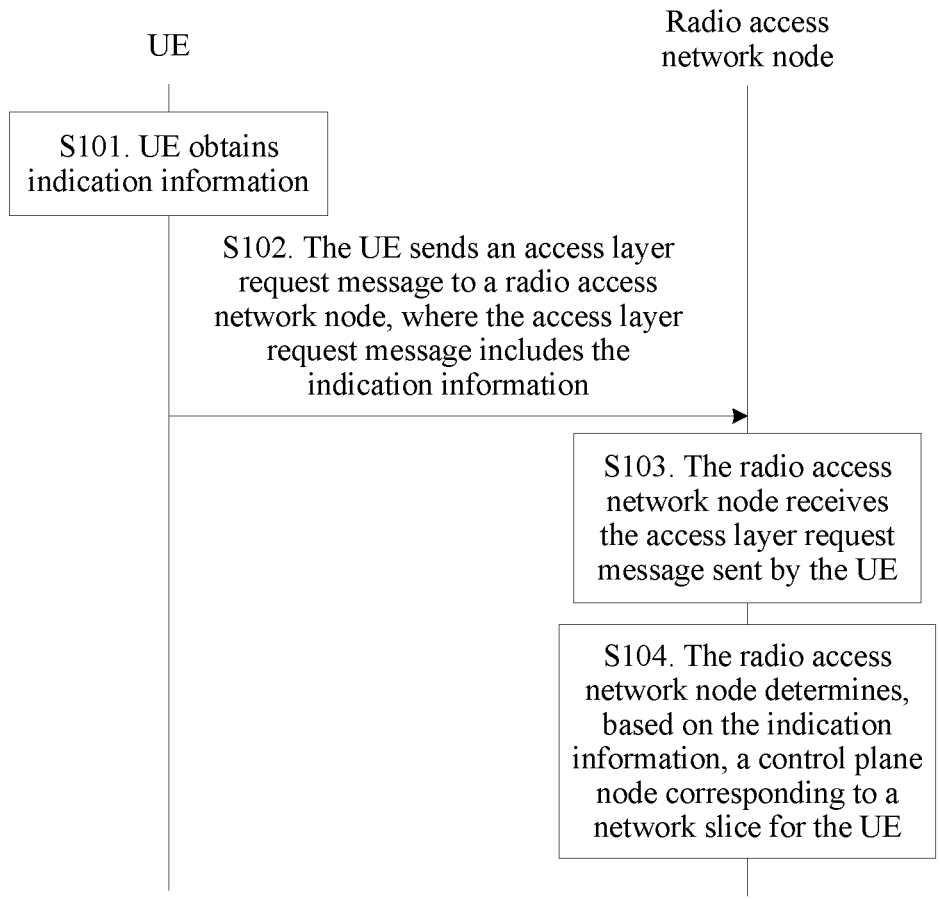
FIG. 3 is a schematic diagram of a method for determining a control plane node according to an embodiment of the present invention.

Based on the wireless communications system shown in FIG. 2, as shown in FIG. 3, an embodiment of the present invention provides a method for determining a control plane node. The method may include the following steps:

S101. UE obtains indication information.

Optionally, in this embodiment of the present invention, a method for obtaining the indication information by the UE may be the following S101a, S101b, or S101c to S101d.

S101a. The UE obtains the indication information that is preconfigured.

As described in S101a, the indication information may be preconfigured in the UE, so that the UE may directly obtain the indication information from a memory of the UE.

S101b. The UE receives the indication information sent by a control plane node.

As described in S101b, the UE may directly receive the indication information sent by the control plane node.

S101c. The UE receives a temporary identity sent by the control plane node, where the temporary identity includes the indication information.

S101d. The UE obtains the indication information based on the temporary identity.

In S101c to S101d, after receiving the temporary identity sent by the control plane node, the UE may obtain the indication information from the temporary identity.

In this embodiment of the present invention, the temporary identity is identifier information that is allocated, based on at least one of a permanent identifier of the UE or a device identifier of the UE, for the UE by the control plane node corresponding to a network slice to which the UE belongs, and the temporary identity may uniquely identify one UE in a network (for example, the 4G system network or the 5G system network). The temporary identity is used, so that exposure of private parameters of the UE, such as the permanent identifier of the UE and the device identifier of the UE in network transmission can be reduced. The permanent identifier of the UE may be an international mobile subscriber identity (IMSI). The device identifier of the UE may be an international mobile equipment identity (IMEI).

Optionally, in this embodiment of the present invention, the temporary identity in S101c to S101d may be a GUTI. The GUTI includes the indication information; or the GUTI includes a GUMMEI, and the GUMMEI includes the indication information. That is, after receiving the GUTI sent by the control plane node, the UE may directly obtain the indication information from the GUTI; or the UE may obtain the indication information from the GUMMEI of the GUTI.

A specific manner in which the GUTI or the GUMMEI of the GUTI includes the indication information is described in detail in the following description of the control plane node, and details are not described herein.

In this embodiment of the present invention, the UE may obtain the indication information by performing any one of S101a, S101b, or S101c to S101d. Obtaining the preconfigured indication information by the UE may reduce implementation complexity; receiving, by the UE, the indication information sent by the control plane node may ensure that an existing message format remains unchanged; and obtaining the indication information by the UE based on a GUTI requires an improvement based on an existing message format, and an implementation thereof is relatively convenient.

It should be noted that, in this embodiment of the present invention, the control plane node and the UE may reach an agreement in advance on which manner in the foregoing manners is used to indicate the indication information. This is not limited in this embodiment of the present invention.

Optionally, in this embodiment of the present invention, corresponding to S101b or S101c to S101d, a process in which the UE obtains indication information from the control plane node and the control plane node sends indication information to the UE may be specifically the following S201 to S204.

S201. The control plane node receives a non-access stratum request message sent by the UE.

S202. The control plane node obtains a use type of the UE based on the non-access stratum request message.

The control plane node may be a control plane node corresponding to a network slice to which the UE belongs, or may be a control plane node that is not corresponding to a network slice to which the UE belongs. This is not specifically limited in the present invention.

Optionally, in this embodiment of the present invention, the use type of the UE is a type of UE that has a same type of communication feature or service feature. The use type of the UE may also be referred to as a type of the UE, a service type of the UE, or a name that can be used to represent all UEs that have a same type of communication feature or service feature. The use type of the UE is usually stored in the subscription data of the UE.

In this embodiment of the present invention, after the control plane node receives the non-access stratum request message sent by the UE, the control plane node may obtain, based on the non-access stratum request message, the use type of the UE from the subscription data that is of the UE and that is stored in a home subscriber server (HSS). Specifically, after the control plane node receives the non-access stratum request message sent by the UE, the control plane node may obtain an identifier of the UE from the non-access stratum request message, and then the control plane node obtains, based on the identifier of the UE, the use type of the UE by querying subscription data that is of the UE and that is stored in the HSS.

S203. The control plane node obtains, based on the use type of the UE and a preconfigured mapping relationship, indication information corresponding to the use type of the UE.

The indication information is used to indicate a network slice to which the UE belongs, and the mapping relationship in S203 includes a mapping relationship between the use type of the UE and the indication information.

In this embodiment of the present invention, in actual implementation, the mapping relationship in S203 may include mapping relationships between use types of a plurality of UEs and a plurality of pieces of indication information. The mapping relationship includes a mapping relationship between the use type of the UE and that is obtained by the control plane node in S202 and the indication information corresponding to the use type of the UE.

For example, it is assumed that the use types of the plurality of UEs include MBB UE, V2V UE, MTC UE, and the like, and the plurality of pieces of indication information include MBB indication information, V2V indication information, MTC indication information, and the like. Therefore, the mapping relationship includes a mapping relationship between the MBB UE and MBB indication information, a mapping relationship between the V2V UE and the V2V indication information, a mapping relationship between the MTC UE and the MTC indication information, and the like. For example, the mapping relationships may be shown in Table 1.

TABLE 1

| Use Type of UE | Indication Information |
|---|---|
| MBB UE | MBB indication information |
| V2V UE | V2V indication information |
| MTC UE | MTC indication information |

In this embodiment of the present invention, S202 to S203 may be performed when the control plane node allocates a temporary identity to the UE. Specifically, when no temporary identity is available to the UE (for example, the UE is powered on for the first time, the UE has deleted a temporary identity previously allocated by the control plane node to the UE, or the UE cannot obtain a temporary identity stored by the UE), the UE may send an access layer request message to the radio access network node by using a permanent identifier of the UE; and after the radio access network node selects a control plane node for the UE, the radio access network node may forward a non-access stratum request message carried in the access layer request message to the control plane node, so that the control plane node may allocate a temporary identity to the UE based on the non-access stratum request message, and perform S202 and S203 when allocating the temporary identity.

It should be noted that, in this embodiment of the present invention, when the control plane node selected by the radio access network node for the UE is different from the control plane node corresponding to the network slice to which the UE belongs, the radio access network node may perform a redirection process to redirect the UE to the network slice to which the UE belongs, and a control plane node corresponding to the network slice provides a customized service for the UE.

S204. The control plane node sends indication information to the UE.

Optionally, in this embodiment of the present invention, a method for sending the indication information by the control plane node to the UE may be S204a or S204b.

S204a. The control plane node sends indication information to the UE.

As described in S204a, the control plane node may directly send the indication information to the UE.

S204b. The control plane node sends a temporary identity to the UE, where the temporary identity includes the indication information.

For detailed description of S204b, refer to related description of S101c to S101d in the foregoing embodiment. Details are not described herein again.

Optionally, in this embodiment of the present invention, the temporary identity in S204b may be a GUTI. The GUTI includes the indication information; or the GUTI includes a GUMMEI, and the GUMMEI includes the indication information.

Specifically, the control plane node may add the indication information to the GUTI or the GUMMEI of the GUTI, and send the GUTI or the GUMMEI of the GUTI to the UE. For example, when the control plane node allocates the GUTI to the UE, the control plane node may add the indication information to a corresponding field in the GUTI or the GUMMEI of the GUTI, and send the GUTI or the GUMMEI of the GUTI to the UE. Specifically, a method for indicating the indication information by the control plane node to the UE by using a GUTI or a GUMMEI of the GUTI may be one of the following methods.

(1) The GUTI includes an MME-temporary mobile subscriber identity (M-TMSI) field, and the M-TMSI field is used to indicate the indication information.

In this embodiment of the present invention, as shown in Table 2, the M-TMSI field includes four bytes (each byte includes 8 bits (for example, 0 to 7 in Table 2), and each byte may be represented by a hexadecimal value), a first byte of the M-TMSI field may be used to indicate the indication information, and remaining three bytes in the M-TMSI field are still used to uniquely identify UE. For example, when generating a GUTI for the UE, the control plane node may first generate, in the M-TMSI field, a value of the first byte of the M-TMSI field based on the indication information. Then the control plane node generates values of the other three bytes of the M-TMSI field for the UE, so as to obtain a complete M-TMSI field.

TABLE 2

| 7 | 6 | 5 | 4 | 3 | 2 | 1 | 0 |
|---|---|---|---|---|---|---|---|
| M-TMSI (indication information) | | | | | | | |
| M-TMSI (Continued) | | | | | | | |
| M-TMSI (Continued) | | | | | | | |
| M-TMSI (Continued) | | | | | | | |

(2) The GUMMEI includes a public land mobile network (PLMN) identifier field, where the PLMN identifier field is used to indicate the indication information.

In this embodiment of the present invention, as shown in Table 3, the PLMN identifier field includes a mobile country code (MCC) and a mobile network code (MNC). The MCC is usually represented by three decimal values indicated by the MCC1, the MCC2, and the MCC3 in Table 3 (for example, 460 represents China's mobile country code). Generally, modification of an MCC is not allowed. The MNC is usually represented by three decimal values indicated by the MNC1, the MNC2, and the MNC3 in Table 3. A value range of MNC may be 000 to 999. In addition to some values that are being used according to wireless communication protocols (for example, 000 for China Mobile and 010 for China Unicom), there are many undefined values. In this embodiment of the present invention, the MNC may be used to indicate the indication information. That is, undefined values in the MNC may be used to establish a one-to-one correspondence with the indication information. For example, 001 may be used to indicate the MBB indication information (the MBB indication information is used to indicate an MBB network slice), 002 may be used to indicate the V2V indication information (the V2V indication information is used to indicate a V2V network slice), and 003 may be used to indicate the MTC indication information (the MTC indication information is used to indicate an MTC network slice). In Table 3, each decimal value occupies four bits.

TABLE 3

| 7 | 6 | 5 | 4 | 3 | 2 | 1 | 0 |
|---|---|---|---|---|---|---|---|
| | MCC2 | | | | MCC1 | | |
| | MNC3 | | | | MCC3 | | |
| | MNC2 | | | | MNC1 | | |

(3) The GUMMEI includes an MME group identifier field, and the MME group identifier field is used to indicate the indication information.

In this embodiment of the present invention, as shown in Table 4, the MME group identifier field includes two bytes (each byte includes 8 bits (for example, 0 to 7 in Table 4), and each byte may be represented by a hexadecimal value). The MME group identifier field may be used to indicate the indication information, that is, undefined values in the MME group identifier field are used to establish a one-to-one correspondence with the indication information. For details about an example of establishing the one-to-one correspondence between the undefined values in the MME group identifier field and the indication information, refer to related description of the one-to-one correspondence between the undefined values in the MNC and the indication information in the foregoing (2). Details are not described herein again.

TABLE 4

| 7 | 6 | 5 | 4 | 3 | 2 | 1 | 0 |
|---|---|---|---|---|---|---|---|
| MME group identifier (MME group ID) | | | | | | | |
| MME group identifier (Continued) | | | | | | | |

(4) The GUTI or the GUMMEI includes a network slice identifier field, and the network slice identifier field is used to indicate the indication information.

In this embodiment of the present invention, the GUTI or the GUMMEI may be extended. A network slice identifier field may be added to the GUTI or the GUMMEI, and then the network slice identifier field is used to indicate the indication information, that is, a value of the network slice identifier field is used to establish a one-to-one correspondence with the indication information. As shown in Table 5, a defined network slice identifier field includes one byte (the byte includes 8 bits (for example, 0 to 7 in Table 5), and the byte may be represented by a hexadecimal value). The network slice identifier field may be used to indicate the indication information, that is, a value in the network slice identifier field is used to establish a one-to-one correspondence with the indication information. For details about an example of establishing the one-to-one correspondence between the value in the network slice identifier field and the indication information, refer to related description of the one-to-one correspondence between the undefined values in the MNC and the indication information in the foregoing (2). Details are not described herein again.

TABLE 5

| 7 | 6 | 5 | 4 | 3 | 2 | 1 | 0 |
|---|---|---|---|---|---|---|---|
| Network slice identifier (network slice ID) | | | | | | | |

All of the M-TMSI field in (1), the PLMN identifier field in (2), and the MME group identifier field in (3) are existing fields in the GUTI, and the network slice identifier field in (4) is a field newly added to the GUTI or the GUMMEI.

This embodiment of the present invention may support a plurality of manners of indicating indication information, so that indication of indication information may be flexibly implemented.

It should be noted that in this embodiment of the present invention, in S101c to S101d, when the temporary identity is the GUTI, for detailed description of a method for obtaining the indication information by the UE from the GUTI or the GUMMEI of the GUTI, refer to related description of the method for indicating the indication information by the control plane node to the UE by using the GUTI or the GUMMEI of the GUTI in S204a and S204b.

S102. The UE sends an access layer request message to a radio access network node, where the access layer request message includes the indication information.

S103. The radio access network node receives the access layer request message sent by the UE.

After the UE obtains the indication information, the UE may add the indication information to the access layer request message, and send the access layer request message to the radio access network node. After the radio access network node receives the access layer request message sent by the UE, the radio access network node may obtain the indication information based on the access layer request message.

Optionally, in this embodiment of the present invention, when the temporary identity is the GUTI, because the UE sends only the GUMMEI in the GUTI when the UE sends the access layer request message to the radio access network node, the method for indicating the indication information by the UE to the radio access network node may be (2), (3), and (4) described in the foregoing embodiment. For details, refer to related description of (2), (3), and (4) in the foregoing embodiment, and details are not described herein again.

In this embodiment, when the UE indicates the indication information to the radio access network node by using a method in (4), the foregoing (4) may be specifically replaced with:

(4') The access layer request message or the GUMMEI includes a network slice identifier field, and the network slice identifier field is used to indicate the indication information.

In this embodiment, the UE may newly add a network slice identifier field to the access layer request message or the GUMMEI to extend the access layer request message or the GUMMEI, and then use the network slice identifier field to indicate the indication information, that is, use a value of the network slice identifier field to establish a one-to-one correspondence with the foregoing indication information.

For detailed description of (4'), refer to related description of (4) in the foregoing embodiment, and details are not described herein again.

Optionally, the access layer request message in this embodiment of the present invention may be another request message such as an RRC connection request message. The non-access stratum request message may be an attach request message, or may be another request message such as a tracking area update (TAU) request message.

S104. The radio access network node determines, based on the indication information, a control plane node corresponding to a network slice for the UE.

Optionally, the indication information in this embodiment of the present invention may be an identifier of the network slice to which the UE belongs, or identifier information of the network slice to which the UE belongs. The identifier information of the network slice to which the UE belongs is used to indicate the identifier of the network slice to which the UE belongs.

It should be noted that if an identifier of a network slice is standardized, for example, operators agree to use a unified network slice identifier, the indication information in this embodiment of the present invention may be the identifier of the network slice to which the UE belongs; or if an identifier of a network slice is not standardized, for example, each operator customizes an identifier of a network slice, the indication information in this embodiment of the present invention may be the identifier information of the network slice to which the UE belongs, that is, information used to indicate the identifier of the network slice to which the UE belongs.

For example, it is assumed that an identifier of a network slice is standardized, for example, an identifier of the MBB network slice is standardized as 100, an identifier of the V2V network slice is standardized as 101, and an identifier of the MTC network slice is standardized as 110. The standardized identifiers of the network slices may be indicated by using corresponding fields according to the method in (1), (2), (3), and (4) or (4') in the foregoing embodiment, that is, 100, 101, and 110 may be directly indicated by using the corresponding fields. It is assumed that an identifier of a network slice is not standardized, for example, an identifier of the MBB network slice is defined as 100, an identifier of the V2V network slice is defined as 101, and an identifier of the MTC network slice is defined as 110, identifier information of the network slices that are not standardized may be indicated by using corresponding fields according to the method in (1), (2), (3), and (4) or (4') in the foregoing embodiment. The identifier information of the defined network slices is used to indicate the identifiers of the network slices, that is, the corresponding fields may be used to indicate 001 (001 is used to indicate 100), 002 (002 is used to indicate 101), and 003 (003 is used to indicate 110).

Optionally, in this embodiment of the present invention, S104, in which the radio access network node determines, based on the indication information, a method for determining a control plane node corresponding to the network slice for the UE, may specifically include the following S104a to S104c.

S104a. The radio access network node obtains, based on the indication information, an identifier of a network slice to which the UE belongs.

S104b. The radio access network node obtains, based on the identifier of the network slice to which the UE belongs and a preconfigured first mapping relationship, an identifier that is of the control plane node and that is corresponding to the identifier of the network slice to which the UE belongs.

The first mapping relationship in S104b includes a mapping relationship between the identifier of the network slice to which the UE belongs and the identifier of the control plane node corresponding to the network slice to which the UE belongs.

In this embodiment of the present invention, in actual implementation, the first mapping relationship in S104b may include mapping relationships between identifiers of a plurality of network slices and identifiers of a plurality of control plane nodes. The first mapping relationship includes a mapping relationship between the identifier that is of the network slice and that is obtained by the radio access network node in S104a and the identifier of the control plane node corresponding to the network slice.

For example, it is assumed that the identifiers of the plurality of network slices include 100, 101, and 110; the identifiers of the plurality of control plane nodes include a control plane node identifier 201, a control plane node identifier 202, and a control plane node identifier 203. Therefore, the foregoing first mapping relationship includes a mapping relationship between 100 and 201, a mapping relationship between 101 and 202, a mapping relationship between 110 and 203, and the like. 100 is an identifier of an MBB network slice and is used to indicate the MBB network slice, and 201 is an identifier of a control plane node corresponding to the MBB network slice. 101 is an identifier of a V2V network slice and is used to indicate the V2V network slice, and 202 is an identifier of a control plane node corresponding to the V2V network slice. 110 is an identifier of an MTC network slice and is used to indicate the MTC network slice, 203 is an identifier of a control plane node corresponding to the MTC network slice.

S104c. The radio access network node determines, for the UE based on the identifier of the control plane node, the control plane node corresponding to the network slice to which the UE belongs.

Optionally, in this embodiment of the present invention, the identifier of the control plane node may be an access address of the control plane node, and the like.

After the radio access network node obtains the identifier that is of the control plane node and that is corresponding to the identifier of the network slice to which the UE belongs, the radio access network node may determine, for the UE based on the identifier of the control plane node, the control plane node corresponding to the network slice to which the UE belongs. Specifically, when the identifier of the control plane node is the access address of the control plane node, the radio access network node may search a preconfigured domain name server (DNS) for the access address of the control plane node, so as to determine, for the UE, the control plane node corresponding to the network slice to which the UE belongs. Then the radio access network node may forward, to the control plane node identified by the access address, the non-access stratum request message carried in the access layer request message sent by the UE, so that the control plane node provides a service for the UE. In this way, it can be ensured that the radio access network node can select, for the UE, the control plane node corresponding to the network slice to which the UE belongs, so as to ensure that the control plane node can provide a customized service for the UE.

Optionally, in this embodiment of the present invention, when the indication information is an identifier of a network slice, S101 may specifically include S101e to S101f.

S101e. UE obtains identifier information of a network slice to which the UE belongs.

For a method for obtaining, by the UE, the identifier information of the network slice to which the UE belongs in S101e, refer to the method for obtaining the indication information by the UE in S101a, S101b, or S101c to S101d (the indication information is the identifier information of the network slice to which the UE belongs). Details are not described herein again.

S101f. The UE obtains, based on the identifier information of the network slice and a preconfigured mapping relationship, an identifier that is of the network slice and that is corresponding to the identifier information of the network slice.

The mapping relationship in S101f includes a mapping relationship between the identifier information of the network slice to which the UE belongs and the identifier of the network slice to which the UE belongs.

In this embodiment of the present invention, in actual implementation, the mapping relationship in S101f may include mapping relationships between identifier information of a plurality of network slices and identifiers of the plurality of network slices. The mapping relationship includes a mapping relationship between the identifier information that is of the network slice and that is obtained by the UE in S101e and an identifier that is of the network slice and that is corresponding to the identifier information.

For example, it is assumed that the identifier information of the plurality of network slices includes 001, 002, and 003, and the identifiers of the plurality of network slices include 100, 101, and 110. Therefore, the mapping relationship includes a mapping relationship between 001 and 100, a mapping relationship between 002 and 101, a mapping relationship between 003 and 110, and the like. 100 is an identifier of an MBB network slice and is used to indicate the MBB network slice. 101 is an identifier of a V2V network slice and is used to indicate the V2V network slice. 110 is an identifier of an MTC network slice and is used to indicate the MTC network slice.

In this embodiment of the present invention, when the indication information obtained by the UE is the identifier of the network slice to which the UE belongs, in one possible implementation, the UE may first obtain the identifier information of the network slice to which the UE belongs, and then the UE obtains, based on the identifier information of the network slice and the preconfigured mapping relationship, the identifier of the network slice to which the UE belongs. In this way, after the UE sends the identifier of the network slice to the radio access network node, it can be ensured that the radio access network node can select, based on the identifier of the network slice, the control plane node corresponding to the network slice (the network slice to which the UE belongs), so as to ensure that the control plane node may provide a customized service for the UE.

Optionally, in this embodiment of the present invention, when the indication information is the identifier information of the network slice, S104a may specifically include S104a1.

S104a1. The radio access network node obtains, based on the identifier information of the network slice and a preconfigured second mapping relationship, an identifier that is of the network slice and that is corresponding to the identifier information of the network slice.

The second mapping relationship in S104a1 includes a mapping relationship between the identifier information of the network slice to which the UE belongs and the identifier of the network slice to which the UE belongs; that is, the second mapping relationship in S104a1 is the same as the mapping relationship in S101f. A difference is that the mapping relationship in S101f is stored in the UE, while the second mapping relationship in the S104a1 is stored in the radio access network node.

For details about and an example of the second mapping relationship in S104a1, refer to description and an example of the mapping relationship in S101f in the foregoing embodiment. Details are not described herein again.

In this embodiment of the present invention, both a method in S101e to S101f for obtaining, by the UE, the identifier of the network slice to which the UE belongs and a method in S104a1 for obtaining, by the radio access network node, the identifier of the network slice to which the UE belongs may be applied to a scenario in which the identifier of the network slice is not standardized. That is, the method for determining a control plane node provided in this embodiment of the present invention are compatible with both a scenario in which the identifier of the network slice has been standardized and the scenario in which the identifier of the network slice is not standardized.

In the method for determining a control plane node provided in this embodiment of the present invention, the control plane node obtains the indication information that is used to indicate the network slice to which the UE belongs, and sends the indication information to the UE. After the UE obtains the indication information, the UE may send the indication information to the radio access network node by using an access layer request message, and the radio access network node determines, for the UE based on the indication information, the control plane node corresponding to the network slice to which the UE belongs.

Based on the foregoing technical solution, the indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

Figure 4:
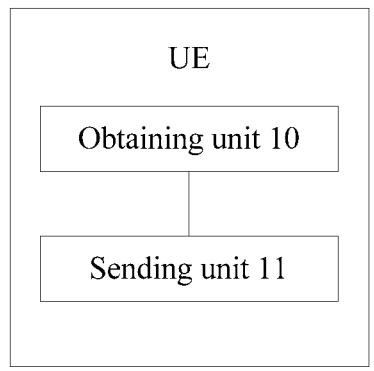
FIG. 4 is a schematic structural diagram of UE according to an embodiment of the present invention.

As shown in FIG. 4, an embodiment of the present invention provides UE. The UE is configured to perform the steps performed by the UE in the foregoing method. The UE may include a module corresponding to a corresponding step. For example, the UE may include:

an obtaining unit 10, configured to obtain indication information, where the indication information is used to indicate a network slice to which the UE belongs; and a sending unit 11, configured to send an access layer request message to a radio access network node, where the access layer request message includes the indication information obtained by the obtaining unit 10, and the access layer request message is used to trigger the radio access network node to determine, based on the indication information, a control plane node corresponding to the network slice for the UE.

Optionally, the obtaining unit 10 is specifically configured to obtain the indication information that is preconfigured.

Optionally, the obtaining unit is specifically configured to receive the indication information sent by the control plane node.

Optionally, the obtaining unit is specifically configured to receive a temporary identity sent by the control plane node, and obtain the indication information based on the temporary identity, where the temporary identity includes the indication information.

Optionally, the temporary identity is a GUTI; and the GUTI includes the indication information, or the GUTI includes a GUMMEI, and the GUMMEI includes the indication information.

Optionally, the GUTI includes an MME-temporary mobile subscriber identity M-TMSI field, and the M-TMSI field is used to indicate the indication information.

Optionally, the GUMMEI includes a public land mobile network PLMN identifier field, and the PLMN identifier field is used to indicate the indication information.

Optionally, the GUMMEI includes a mobility management entity MME group identifier field, and the MME group identifier field is used to indicate the indication information.

Optionally, the GUTI or the GUMMEI includes a network slice identifier field, and the network slice identifier field is used to indicate the indication information.

Optionally, the indication information is an identifier of the network slice or identifier information of the network slice, and the identifier information of the network slice is used to indicate the identifier of the network slice.

Optionally, the indication information is the identifier of the network slice.

The obtaining unit 10 is specifically configured to: obtain the identifier information of the network slice; and obtain, based on the identifier information of the network slice and a preconfigured mapping relationship, the identifier that is of the network slice and that is corresponding to the identifier information of the network slice, where the mapping relationship includes a mapping relationship between the identifier information of the network slice and the identifier of the network slice.

It may be understood that the UE in this embodiment may be corresponding to the UE in the method for determining a control plane node in the foregoing method embodiment (including the method embodiment shown in FIG. 3 and a method embodiment not shown in a figure), and division and/or functions of each module in the UE in this embodiment are for implementing a method procedure shown in the foregoing method embodiment. To avoid repetition, details are not described herein again.

This embodiment of the present invention provides the UE. The indication information that is sent by the UE to the radio access network node and that is used for determining a control plane node for the UE can accurately indicate the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Figure 5:
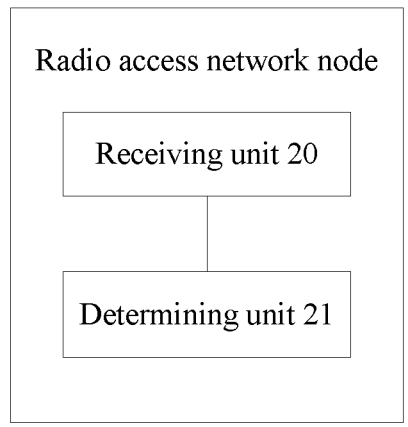
FIG. 5 is a schematic structural diagram of a radio access network node according to an embodiment of the present invention.

As shown in FIG. 5, an embodiment of the present invention provides a radio access network node. The radio access network node is configured to perform steps performed by the radio access network node in the foregoing method. The radio access network node may include a module corresponding to a corresponding step. For example, the radio access network node may include:

a receiving unit 20, configured to receive an access layer request message sent by the UE, where the access layer request message includes indication information, and the indication information is used to indicate a network slice to which the UE belongs; and a determining unit 21, configured to determine, based on the indication information received by the receiving unit 20, a control plane node corresponding to the network slice for the UE.

Optionally, the indication information may be carried in a temporary identity in the access layer request message.

Optionally, the access layer request message includes a GUMMEI, and the GUMMEI includes the indication information.

Optionally, the GUMMEI includes a public land mobile network PLMN identifier field, and the PLMN identifier field is used to indicate the indication information.

Optionally, the GUMMEI includes a mobility management entity MME group identifier field, and the MME group identifier field is used to indicate the indication information.

Optionally, the access layer request message or the GUMMEI includes a network slice identifier field, and the network slice identifier field is used to indicate the indication information.

Optionally, the indication information is an identifier of the network slice or identifier information of the network slice, and the identifier information of the network slice is used to indicate the identifier of the network slice.

Optionally, the determining unit 21 is specifically configured to: obtain the identifier of the network slice based on the indication information; obtain, based on the identifier of the network slice and a preconfigured first mapping relationship, an identifier that is of the control plane node and that is corresponding to the identifier of the network slice; and determine, based on the identifier of the control plane node, the control plane node corresponding to the network slice for the UE, where the first mapping relationship includes a mapping relationship between the identifier of the network slice and the identifier of the control plane node.

Optionally, the indication information is the identifier information of the network slice.

The determining unit 21 is specifically configured to obtain, based on the identifier information of the network slice and a preconfigured second mapping relationship, the identifier that is of the network slice and that is corresponding to the identifier information of the network slice, where the second mapping relationship includes a mapping relationship between the identifier information of the network slice and the identifier of the network slice.

It may be understood that the radio access network node in this embodiment may be corresponding to the radio access network node in the method for determining a control plane node in the foregoing method embodiment (including the method embodiment shown in FIG. 3 and a method embodiment not shown in a figure), and division and/or functions of each module in the radio access network node in this embodiment are for implementing a method procedure shown in the foregoing method embodiment. To avoid repetition, details are not described herein again.

This embodiment of the present invention provides the radio access network node. The indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

Figure 6:
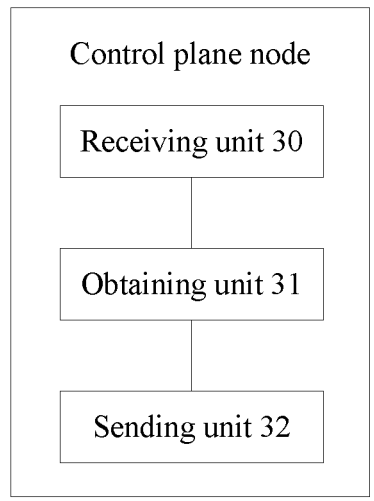
FIG. 6 is a schematic structural diagram of a control plane node according to an embodiment of the present invention.

As shown in FIG. 6, an embodiment of the present invention provides a control plane node, and the control plane node is configured to perform steps performed by the control plane node in the foregoing method. The control plane node may include a module corresponding to a corresponding step. For example, the control plane node may include:

a receiving unit 30, configured to receive a non-access stratum request message sent by UE; an obtaining unit 31, configured to obtain a use type of the UE based on the non-access stratum request message received by the receiving unit 30, and obtain, based on the use type of the UE and a preconfigured mapping relationship, indication information corresponding to the use type of the UE, where the mapping relationship includes a mapping relationship between the use type of the UE and the indication information, and the indication information is used to indicate a network slice to which the UE belongs; and a sending unit 32, configured to send the indication information obtained by the obtaining unit 31 to the UE.

Optionally, the sending unit 32 is specifically configured to send a temporary identity to the UE, where the temporary identity includes the indication information.

Optionally, the temporary identity may be a GUTI; and the GUTI includes the indication information, or the GUTI includes a GUMMEI, and the GUMMEI includes the indication information.

Optionally, the GUTI includes an MME-temporary mobile subscriber identity M-TMSI field, and the M-TMSI field is used to indicate the indication information.

Optionally, the GUMMEI includes a public land mobile network PLMN identifier field, and the PLMN identifier field is used to indicate the indication information.

Optionally, the GUMMEI includes a mobility management entity MME group identifier field, and the MME group identifier field is used to indicate the indication information.

Optionally, the GUTI or the GUMMEI includes a network slice identifier field, and the network slice identifier field is used to indicate the indication information.

Optionally, the indication information is an identifier of the network slice or identifier information of the network slice, and the identifier information of the network slice is used to indicate the identifier of the network slice.

It may be understood that the control plane node in this embodiment may be corresponding to the control plane node in the method for determining a control plane node in the foregoing method embodiment (including the method embodiment shown in FIG. 3 and a method embodiment not shown in a figure), and division and/or functions of each module in the control plane node in this embodiment are for implementing the method procedure shown in the foregoing method embodiment. To avoid repetition, details are not described herein again.

This embodiment of the present invention provides the control plane node. The control plane node may send, to the UE, the indication information that accurately indicates the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Figure 7:
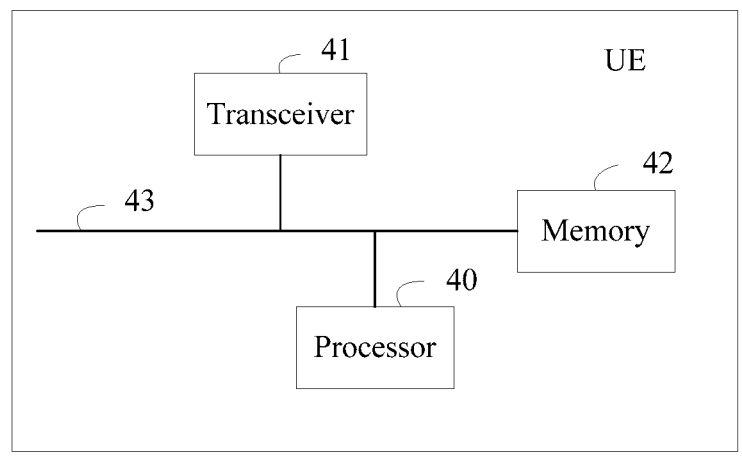
FIG. 7 is a schematic diagram of hardware of UE according to an embodiment of the present invention.

As shown in FIG. 7, an embodiment of the present invention provides UE. The UE includes: a processor 40, a transceiver 41, a memory 42, and a system bus 43. The memory 42 is configured to store a computer executable instruction. The processor 40, the transceiver 41, and the memory 42 are connected to and communicate with each other by using the system bus 43. When the UE runs, the processor 40 executes the computer executable instruction stored in the memory 42, so that the UE performs the method for determining a control plane node described in any one of the foregoing method embodiments (including the method embodiment shown in FIG. 3 and a method embodiment not shown in a figure). For a specific method for determining a control plane node, refer to related descriptions in the foregoing method embodiments, and details are not described herein again.

This embodiment further provides a storage medium. The storage medium may include the memory 42.

The processor 40 may be a central processing unit (CPU). Alternatively, the processor 40 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The processor 40 may be a dedicated processor, and the dedicated processor may include at least one of a baseband processing chip, a radio frequency processing chip, or the like. The dedicated processor may further include a chip having another dedicated processing function of the UE.

The memory 42 may include a volatile memory, for example, a random access memory (RAM). The memory 42 may include a non-volatile memory, for example, a read-only memory (ROM), a flash memory, a hard disk drive (HDD), or a solid state drive (SSD). The memory 42 may include a combination of the foregoing types of memories.

The system bus 43 may include a data bus, a power bus, a control bus, a signal status bus, and the like. In this embodiment, for clear description, various buses are represented by the system bus 43 in FIG. 7.

The transceiver 41 may be specifically a transceiver on a UE. The transceiver may be a wireless transceiver. For example, the wireless transceiver may be an antenna of the UE. The processor 40 performs data receiving and transmission with another node such as a radio access network node by using the transceiver 41.

In a specific implementation process, all the steps corresponding to the UE in the method procedure shown in the foregoing method embodiments may be implemented in a manner in which the processor 40 in a form of hardware executes the computer executable instruction that is in a form of software and that is stored in the memory 42. To avoid repetition, details are not described herein again.

This embodiment of the present invention provides the UE. The indication information that is sent by the UE to the radio access network node and that is used for determining a control plane node for the UE can accurately indicate the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

Figure 8:
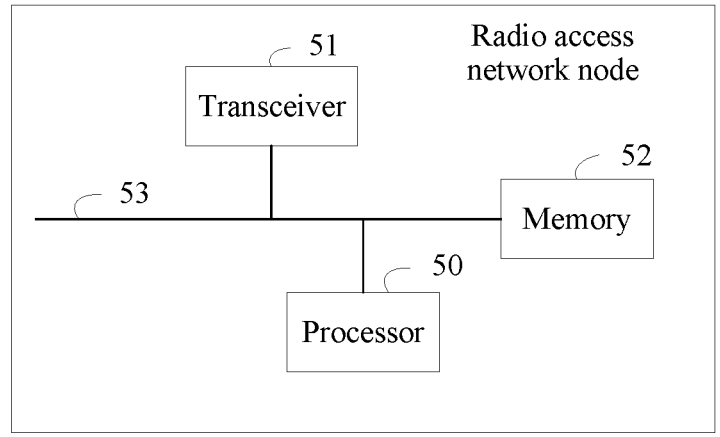
FIG. 8 is a schematic diagram of hardware of a radio access network node according to an embodiment of the present invention.

As shown in FIG. 8, an embodiment of the present invention provides a radio access network node. The radio access network node includes: a processor 50, a transceiver 51, a memory 52, and a system bus 53. The memory 52 is configured to store a computer executable instruction. The processor 50, the transceiver 51, and the memory 52 are connected to and communicate with each other by using the system bus 53. When the radio access network node runs, the processor 50 executes the computer executable instruction stored in the memory 52, so that the radio access network node performs the method for determining a control plane node described in any one of the foregoing method embodiments (including the method embodiment shown in FIG. 3 and a method embodiment not shown in a figure). For a specific method for determining a control plane node, refer to related descriptions in the foregoing method embodiments, and details are not described herein again.

This embodiment further provides a storage medium. The storage medium may include the memory 52.

The processor 50 may be a CPU. The processor 50 may be another general-purpose processor, a DSP, an ASIC, an FPGA, or another programmable logic device, a discrete gate or a transistor logic device, a discrete hardware component, or the like. The general-purpose processor may be a microprocessor, or the processor may be any conventional processor or the like.

The processor 50 may be a dedicated processor, and the dedicated processor may include at least one of a baseband processing chip, a radio frequency processing chip, or the like. The dedicated processor may further include a chip having another dedicated processing function of the radio access network node.

The memory 52 may include a volatile memory, for example, a RAM. The memory 52 may also include a non-volatile memory, for example, a ROM, a flash memory, an HDD, or an SSD. The memory 52 may further include a combination of the foregoing types of memories.

The system bus 53 may include a data bus, a power bus, a control bus, a signal status bus, and the like. In this embodiment, for clear description, various buses are represented by the system bus 53 in FIG. 8.

The transceiver 51 may be specifically a transceiver on the radio access network node. The transceiver may be a wireless transceiver. For example, the wireless transceiver may be an antenna of the radio access network node. The processor 50 performs data receiving and transmission with another node such as UE or a control plane node by using the transceiver 51.

In a specific implementation process, all the steps corresponding to the radio access network node in the method procedure shown in the foregoing method embodiments may be implemented in a manner in which the processor 50 in a form of hardware executes the computer executable instruction that is in a form of software and that is stored in the memory 52. To avoid repetition, details are not described herein again.

This embodiment of the present invention provides the radio access network node. The indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

Figure 9:
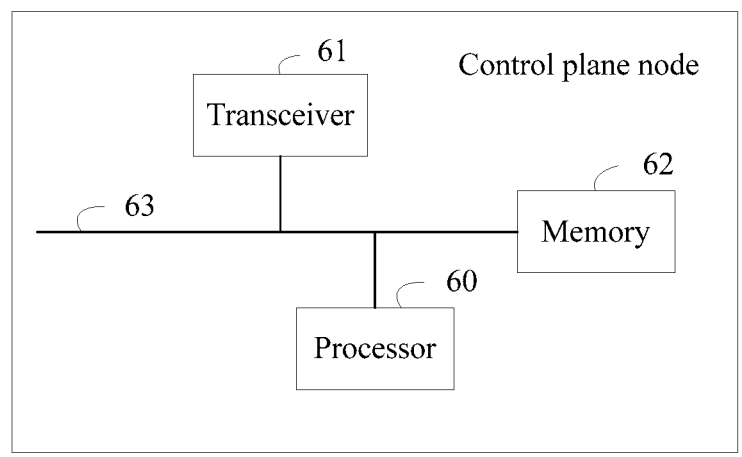
FIG. 9 is a schematic diagram of hardware of a control plane node according to an embodiment of the present invention.

As shown in FIG. 9, an embodiment of the present invention provides a control plane node. The control plane node includes: a processor 60, a transceiver 61, a memory 62, and a system bus 63. The memory 62 is configured to store a computer executable instruction. The processor 60, the transceiver 61, and the memory 62 are connected to and communicate with each other by using the system bus 63. When the control plane node runs, the processor 60 executes the computer executable instruction stored in the memory 62, so that the control plane node performs the method for determining a control plane node described in any one of the foregoing method embodiments (including the method embodiment shown in FIG. 3 and a method embodiment not shown in a figure). For a specific method for determining a control plane node, refer to related descriptions in the foregoing method embodiments, and details are not described herein again.

This embodiment further provides a storage medium. The storage medium may include the memory 62.

The processor 60 may be a CPU. The processor 60 may be another general-purpose processor, a DSP, an ASIC, an FPGA, or another programmable logic device, a discrete gate or a transistor logic device, a discrete hardware component, or the like. The general-purpose processor may be a microprocessor, or the processor may be any conventional processor or the like.

The processor 60 may be a dedicated processor, and the dedicated processor may include at least one of a baseband processing chip, a radio frequency processing chip, or the like. The dedicated processor may further include a chip having another dedicated processing function of the control plane node.

The memory 62 may include a volatile memory, for example, a RAM. The memory 62 may also include a non-volatile memory, for example, a ROM, a flash memory, an HDD, or an SSD. The memory 62 may further include a combination of the foregoing types of memories.

The system bus 63 may include a data bus, a power bus, a control bus, a signal status bus, and the like. In this embodiment, for clear description, various buses are represented by the system bus 63 in FIG. 9.

The transceiver 61 may be specifically a transceiver on the control plane node. The transceiver may be a wireless transceiver. For example, the wireless transceiver may be an antenna of the control plane node. The processor 60 performs data receiving and transmission with another node such as UE or a radio access network node by using the transceiver 61.

In a specific implementation process, all the steps corresponding to the control plane node in the method procedure shown in the foregoing method embodiments may be implemented in a manner in which the processor 60 in a form of hardware executes the computer executable instruction that is in a form of software and that is stored in the memory 62. To avoid repetition, details are not described herein again.

This embodiment of the present invention provides the control plane node. The control plane node may send, to the UE, the indication information that accurately indicates the network slice to which the UE belongs. Therefore, after the UE sends the indication information to the radio access network node, the radio access network node may determine, for the UE based on the indication information, the control plane node corresponding to the network slice to which the UE belongs, thereby ensuring that the control plane node can provide a customized service for the UE.

An embodiment of the present invention provides a wireless communications system. The wireless communications system includes UE, a radio access network node, and a control plane node. For example, as shown in FIG. 2, FIG. 2 is a schematic architectural diagram of a wireless communications system according to an embodiment of the present invention. The UE may be the UE shown in FIG. 4 or FIG. 7; the radio access network node may be the UE shown in FIG. 5 or FIG. 8; and the control plane node may be the control plane node shown in FIG. 6 or FIG. 9.

For detailed description of the UE in this embodiment of the present invention, refer to related description of the UE in the embodiment shown in FIG. 4 or FIG. 7. For detailed description of the radio access network node, refer to related description of the radio access network node in the embodiment shown in FIG. 5 or FIG. 8. For detailed description of the control plane node, refer to related description of the control plane node in the embodiment shown in FIG. 6 or FIG. 9. Details are not described herein again.

In the wireless communications system provided in this embodiment of the present invention, the control plane node obtains indication information that is used to indicate a network slice to which the UE belongs, and sends the indication information to the UE. After the UE obtains the indication information, the UE may send the indication information to the radio access network node by using an access layer request message, and the radio access network node determines, for the UE based on the indication information, a control plane node corresponding to the network slice to which the UE belongs.

Based on the foregoing technical solution, the indication information used by the radio access network node to determine a control plane node for UE may accurately indicate the network slice to which the UE belongs. Therefore, the radio access network node may determine, for the UE based on the indication information, the control plane node corresponding to the network slice to which the UE belongs, thereby ensuring that the control plane node can provide a customized service for the UE.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a control plane node, comprising: obtaining, by a terminal, indication information, wherein the indication information is used to indicate a network slice corresponding to a service type of the terminal; and sending, by the terminal, an access layer request message to a radio access network node, wherein the access layer request message comprises the indication information, and the access layer request message triggers the radio access network node to determine, based on the indication information, the control plane node corresponding to the network slice for the terminal, wherein the obtaining, by the terminal, the indication information comprises obtaining, by the terminal, the indication information preconfigured in the terminal, wherein the indication information is an identifier of the network slice and when the identifier of the network slice is standardized, operators commonly agree to use a unified identifier of the network slice, and wherein when the identifier of the network slice is not standardized, operators customize the identifier of the network slice.

2. The method according to claim 1, wherein the control plane node comprises a first control plane node and second control plane node,
    wherein the terminal obtains the indication information from the first control plane node, and
    wherein the second control plane node corresponds to the network slice for the terminal.

3. A method for determining a control plane node, comprising: receiving, by a radio access network node, an access layer request message sent by a terminal, wherein the access layer request message comprises indication information indicating a network slice corresponding to a service type of the terminal; and determining, by the radio access network node based on the indication information, a second control plane node corresponding to the network slice for the terminal, wherein the indication information in the access layer request message is from a first control plane node based on a non-access stratum request message from the terminal to the first control plane node, wherein the indication information is preconfigured in the terminal, wherein the indication information is an identifier of the network slice and when the identifier of the network slice is standardized, operators commonly agree to use a unified identifier of the network slice, and wherein when the identifier of the network slice is not standardized, operators customize the identifier of the network slice.

4. The method according to claim 3, wherein the determining, by the radio access network node based on the indication information, the second control plane node corresponding to the network slice for the terminal comprises:
    obtaining, by the radio access network node, the identifier of the network slice based on the indication information;
    obtaining, by the radio access network node based on the identifier of the network slice and a preconfigured first mapping relationship, an identifier of the control plane node and that corresponds to the identifier of the network slice, wherein the first mapping relationship comprises a mapping relationship between the identifier of the network slice and the identifier of the second control plane node; and determining, by the radio access network node based on the identifier of the second control plane node, the second control plane node corresponding to the network slice for the terminal.

5. The method according to claim 4, wherein the obtaining, by the radio access network node, the identifier of the network slice based on the indication information comprises:

obtaining, by the radio access network node based on the identifier information of the network slice and a preconfigured second mapping relationship, the identifier of the network slice that corresponds to the identifier information of the network slice, wherein the second mapping relationship comprises a mapping relationship between the identifier information of the network slice and the identifier of the network slice.

6. A terminal, comprising: a processor; and a non-transitory memory storing computer readable instructions that when executed by the processor configure the terminal for: obtaining, by a terminal, indication information, wherein the indication information is used to indicate a network slice corresponding to a service type of the terminal; and sending an access layer request message to a radio access network node, wherein the access layer request message comprises the indication information obtained by the obtaining unit, the access layer request message triggers the radio access network node to determine, based on the indication information, a control plane node corresponding to the network slice for the terminal, wherein the obtaining, by the terminal, the indication information comprises obtaining, by the terminal, the indication information preconfigured in the terminal, wherein the indication information is an identifier of the network slice and when the identifier of the network slice is standardized, operators commonly agree to use a unified identifier of the network slice, and wherein when the identifier of the network slice is not standardized, operators customize the identifier of the network slice.

7. The terminal according to claim 6, wherein the control plane node comprises a first control plane node and second control plane node, wherein the terminal obtains the indication information from the first control plane node, and wherein the second control plane node corresponds to the network slice for the terminal.

8. A radio access network node, comprising: a processor; and a non-transitory memory storing computer readable instructions that when executed by the processor configure the radio access network node for: receiving an access layer request message sent by a terminal, wherein the access layer request message comprises indication information that indicates a network slice corresponding to a service type of the terminal; and determining, based on the indication information, a second control plane node corresponding to the network slice for the terminal, wherein the indication information in the access layer request message is from a first control plane node based on a non-access stratum request message from the terminal to the first control plane node, wherein the indication information is preconfigured in the terminal, wherein the indication information is a unified identifier of the network slice, wherein the indication information is an identifier of the network slice and when the identifier of the network slice is standardized, operators commonly agree to use a unified identifier of the network slice, and wherein when the identifier of the network slice is not standardized, operators customize the identifier of the network slice.

9. The radio access network node according to claim 8, wherein the memory further stores instructions that when executed by the processor configure the radio access network node for:

obtaining the identifier of the network slice based on the indication information; obtaining, based on the identifier of the network slice and a preconfigured first mapping relationship, an identifier of the second control plane node and that corresponds to the identifier of the network slice; and determining, based on the identifier of the second control plane node, the second control plane node corresponding to the network slice for the terminal, wherein the first mapping relationship comprises a mapping relationship between the identifier of the network slice and the identifier of the second control plane node.

10. The radio access network node according to claim 9, wherein the memory further stores instructions that when executed by the processor configure the radio access network node for:

obtaining, based on the identifier information of the network slice and a preconfigured second mapping relationship, the identifier of the network slice that corresponds to the identifier information of the network slice, wherein the second mapping relationship comprises a mapping relationship between the identifier information of the network slice and the identifier of the network slice.

11. A wireless communications system, comprising a radio access network node, a first control plane node and a second control plane node, wherein the radio access network node is configured to: receive an access layer request message sent by a terminal, wherein the access layer request message comprises indication information indicating a network slice corresponding to a service type of the terminal; and determine, based on the indication information, that the second control plane node corresponds to the network slice for the terminal, wherein the indication information in the access layer request message is from the first control plane node based on a non-access stratum request message from the terminal to the first control plane node, wherein the indication information is preconfigured in the terminal, wherein the indication information is an identifier of the network slice and when the identifier of the network slice is standardized, operators commonly agree to use a unified identifier of the network slice, and wherein when the identifier of the network slice is not standardized, operators customize the identifier of the network slice.

* * * * *